(12) United States Patent
Fan et al.

(10) Patent No.: US 11,716,998 B2
(45) Date of Patent: Aug. 8, 2023

(54) MICROWAVE PROCESSING METHOD FOR FOOD MADE OF FLOUR AND RICE FERMENTED WITH SOURDOUGH

(71) Applicants: Jiangnan University, Wuxi (CN); WUXI HUASHUNMINSHENG FOOD CO. LTD., Wuxi (CN); FUJIAN ANJOY FOOD CO. LTD., Xiamen (CN); HUBEI ANJOY FOOD CO. LTD., Qianjiang (CN)

(72) Inventors: Darning Fan, Wuxi (CN); Bowen Yan, Wuxi (CN); Yejun Wu, Wuxi (CN); Huizhang Lian, Wuxi (CN); Kai Wang, Wuxi (CN); Jianxin Zhao, Wuxi (CN); Hao Zhang, Wuxi (CN); Huayu Yang, Wuxi (CN); Xiuxiu Li, Wuxi (CN); Yin Zhang, Wuxi (CN); Jinbiao Fei, Wuxi (CN); Wenguo Zhou, Wuxi (CN); Ke Pang, Wuxi (CN); Jianlian Huang, Wuxi (CN); Qingmiao Zhang, Wuxi (CN); Wei Chen, Nuxi (CN)

(73) Assignees: JIANGNAN UNIVERSITY, Wuxi (CN); WUXI HUASHUNMINSHENG FOOD CO. LTD., Wuxi (CN); ANJOY FOODS GROUP CO., LTD., Xiamen (CN); HUBEI ANJOY FOOD CO. LTD., Qianjiang (CN)

( * ) Notice: Subject to any disclaimer, the term of this patent is extended or adjusted under 35 U.S.C. 154(b) by 567 days.

(21) Appl. No.: 16/916,365

(22) Filed: Jun. 30, 2020

(65) Prior Publication Data
US 2020/0329720 A1    Oct. 22, 2020

Related U.S. Application Data

(63) Continuation of application No. PCT/CN2019/097401, filed on Jul. 24, 2019.

(30) Foreign Application Priority Data

Dec. 25, 2018 (CN) .......................... 201811589417.0

(51) Int. Cl.
*A21D 8/06* (2006.01)
*A21D 13/80* (2017.01)
*A21D 8/04* (2006.01)

(52) U.S. Cl.
CPC .............. *A21D 8/06* (2013.01); *A21D 8/045* (2013.01); *A21D 8/047* (2013.01); *A21D 13/80* (2017.01)

(58) Field of Classification Search
None
See application file for complete search history.

(56) References Cited

U.S. PATENT DOCUMENTS 4,929,465 A * 5/1990 Kanafani ................. A21D 8/06
426/243

FOREIGN PATENT DOCUMENTS

CN    105010463 A    11/2015
CN    106102480 A    11/2016
(Continued)

OTHER PUBLICATIONS

Machine translation of CN 105010463, Publication date: Nov. 4, 2015. pp. 1-4. (Year: 2015).*

(Continued)

*Primary Examiner* — Jenna A Watts
(74) *Attorney, Agent, or Firm* — IPro, PLLC

(57) ABSTRACT

The present disclosure discloses a microwave processing method for food made of flour and rice fermented with sourdough and belongs to the technical field of food processing. It comprises: adding a sourdough to the raw material to prepare a steamed cake batter; fermenting the batter under the dielectric constant of 20~34, the loss factor of 6.3~9.0, the moisture content of 45~55% and the water activity of 0.920~0.980; and using microwave heating to obtain the microwave-steamed cake. Due to the regulating effect of the sourdough fermentation on the dielectric properties of the food material, it solves the problems of hard core, textual firmness and toughness, dryness and weak flavor caused by fast and uneven microwave heating without adding food additives; meanwhile, the sourdough fermentation process is optimized and the DY and additive amount (Continued)

of the sourdough are controlled to obtain the microwave-steamed cake with larger specific volume, lower hardness, more fine and uniform pores and better taste.

9 Claims, 2 Drawing Sheets

(56) References Cited

FOREIGN PATENT DOCUMENTS

| CN | 107568585 A | 1/2018 |
| CN | 109527377 A | 3/2019 |

OTHER PUBLICATIONS

Mironeasa, et al. "Dough Rheological Behavior and Microstructure Characterization of Composite Dough with Wheat and Tomato Seed Flours". Available online as of Nov. 30, 2019 from Foods, 2019, 8, 626. pp. 1-15. (Year: 2019).*

Fan, et al. "Full-time respnse of starch subjected to microwave heating". Available online as of Jun. 21, 2017 from www.nature.com/scientificreports. pp. 1-12. (Year: 2017).*

PCT/CN2019/097401 ISR Mail Date Oct. 24, 2019.

* cited by examiner

MICROWAVE PROCESSING METHOD FOR FOOD MADE OF FLOUR AND RICE FERMENTED WITH SOURDOUGH

TECHNICAL FIELD

The present disclosure relates to a microwave processing method for food made of flour and rice fermented with sourdough, and belongs to the technical field of food processing.

BACKGROUND

Fermented food made of flour and rice is the main traditional staple food in China. At present, common ones include steamed cake, steamed buns and steamed rolls, etc., which are popular with consumers for their unique flavor, rich nutrition and soft taste. These fermented foods are typically made using grain flours such as wheat flour or rice, together with processing by blending, fermenting, molding, proofing, and heating. The heating process is the last but most important step in the production of fermented rice and flour food, which is accompanied by starch gelation, protein denaturation, volume expansion and water evaporation. Steam heating is the traditional method of fermented rice and flour food production, though its drawbacks including energy-extensive consumption, low-level efficiency, short shelf life and insufficient flavor greatly limit the large-scale industrial production. To solve the above problems, microwave heating, as a typical fast heating method, possesses the advantages of energy saving, high efficiency, selective heating, less nutrition loss, convenient and easy control and has gradually attracted widespread attention from scholars, which meets the fast-paced consumer lifestyle of modern people.

Traditional fermented rice and flour food is heated by means of radiating heat from a heat source and the heat conduction and convection process caused by the temperature difference between the heat source and food. While in microwave heating, it works through the alternating electric and magnetic fields of microwave radiation, which excite the polarity orientation of dipolar molecules in a substance and generate friction effect with neighboring molecules to achieve rapid heating. In the process of microwave heating, the absorption and conversion of microwave energy depend on the dielectric properties of food materials, which are the inherent electrical properties that play an important role in improving the quality of microwave products. The dielectric properties are expressed by the dielectric constant ($\varepsilon'$), representing the ability of a material to store electromagnetic energy, and the loss factor ($\varepsilon''$), representing the ability to dissipate energy in the form of heat, which largely determine the interaction between microwave and food components. Therefore, detecting and adjusting the dielectric properties of food materials is helpful to improve the effect of microwave heating and the quality of products.

However, mechanism and speed of microwave heating also induce some common quality problems, for instance, hard core, textual firmness and toughness, dryness, rapid staling and weak flavor. Thereby numerous studies have been trying to add food additives to improve the quality of microwave products, such as sugar, emulsifiers, organic acids, and hydrocolloids. Furthermore, along with the consumer awareness, the chemical additives in food are no longer acceptable, so it is urgent to develop a method that can effectively improve the physical properties of fermented rice and flour food during the microwave heating process.

SUMMARY

To resolve the contradiction between the defects, e.g., hard core, textual firmness and toughness, dryness and weak flavor caused by too fast and uneven microwave heating, and the addition of food additives, the present disclosure provides a processing method for fermented rice and flour food by sourdough addition based on dielectric adjustment, which solves the above-mentioned problems by utilizing the microbial fermentation to adjust the dielectric properties of the food materials.

The present disclosure provides a processing method for steamed cake, comprising: adding a sourdough to the raw materials to prepare a batter of steamed cake; fermenting the batter under a dielectric constant of 20~34, a loss factor of 6.3~9.0, a moisture content of 45~55% and water activity of 0.920~0.980; and then using microwave heating to prepare the microwave-steamed cake.

Optionally, adding a sourdough to the raw materials to prepare a batter of steamed cake; fermenting the batter under the dielectric constant of 22~24, the loss factor of 7.1~7.5, the moisture content of 50~52% and the water activity of 0.940~0.960; and then using microwave heating to prepare the microwave-steamed cake.

Optionally, a dough yield (DY) of the sourdough is 170~180 during preparation, and the DY is defined as:

$$DY = \frac{(\text{flour(g)} + \text{water(g)}) \times 100}{\text{flour(g)}},$$

and the fermentation time of the sourdough is 12~13 h.

Optionally, an additive amount of the sourdough is 8~12 wt. %, by weight.

Optionally, an additive amount of the lyophilized *lactobacillus* starter is 0.1~0.3 wt. % by weight of flour during the preparation of the sourdough, and the initial living number of lactic acid bacteria in the sourdough is 1~3×10⁷ CFU/g flour.

Optionally, the flour used in the preparation of the sourdough is high-gluten wheat flour, in which a content of wet gluten is 30~32%.

Optionally, the preparation of the sourdough comprises: taking 200 portions of high-gluten wheat flour, 140~160 portions of water and 0.2~0.6 portions of lyophilized *lactobacillus* starter by weight, well mixing and then fermenting in a cultivation cabinet, setting a fermentation temperature to be 37~38° C. and the fermentation time to be 12~13 h, and obtaining the sourdough fermented by *Lactobacillus plantarum*.

Optionally, during the fermentation of the steamed cake batter, the fermentation temperature and relative humidity are controlled at 37~38° C. and 80~85%, respectively.

Optionally, the raw material of the steamed cake is compounded from wheat starch and wheat gluten, and wherein the weight of the wheat gluten is 10~20% of the wheat starch.

Optionally, the preparation of the steamed cake batter comprises: taking 352~368 portions of the raw material, mixing with 32~48 portions of sourdough, 48~60 portions of sugar, 4.8~6 portions of active dry yeast, 2~2.5 portions of baking powder and 260~266 portions of water by weight, and whipping to obtain the steamed cake batter.

Optionally, the preparation further comprises: adjusting the steamed cake batter in the dielectric constant of 30~34, the loss factor of 9.0~10.5, the moisture content of 50~52% and the water activity of 0.940~0.960 batter at the beginning of fermentation.

Optionally, the dielectric constant and the loss factor are measured at 2.45 GHz using an open-ended coaxial probe technique. A measurement system comprises an E5071C vector network analyzer, an 85070E high-temperature probe, an open-ended coaxial line, a computer and test software.

The beneficial effects of the present disclosure are:

Compared with the existing technology, the present disclosure has the following advantages:

1. The present disclosure uses sourdough fermentation technology and optimizes the sourdough process based on the effect of sourdough fermentation in the dielectric regulation of the material system, by controlling the DY, fermentation time and additive amount of the sourdough during preparation, thereby the steamed cake batter is adjusted to be fermented under the dielectric constant of 22~24, the loss factor of 7.1~7.5, the moisture content of 50~52% and the water activity of 0.940~0.960, which significantly improves the effect of microwave heating and the quality of the microwave-steamed cake. Moreover, the obtained products have larger specific volume, softer and more elastic texture, uniform and fine pores and better than existing products of this kind. The present disclosure solves the problems such as hard core, textual firmness and toughness, dryness and weak flavor caused by fast and uneven microwave heating without adding food additives.

2. The products obtained by the present disclosure are nutritive, healthy and flavorful. The sourdough combined with microwave heating method effectively avoids the potential food safety problems brought about by the use of chemical additives, and meets the growing consumer demand for green without chemical addition. In addition, the processing method in the present disclosure is simple, maneuverable, energy-saving and environmentally-friendly, and is suitable for mechanized large-scale industrial production applications.

BRIEF DESCRIPTION OF FIGURES

To be more clearly illustrating the technical solutions to the examples of the present disclosure, the figures required to be used in the description of the examples are briefly described below. It is obvious that the figures described below are only for some examples of the present disclosure. It is apparent to one of ordinary technicians in this field that other figures may be obtained based on the accompanying figures without inventive effort.

DETAILED DESCRIPTION

Figure 1:
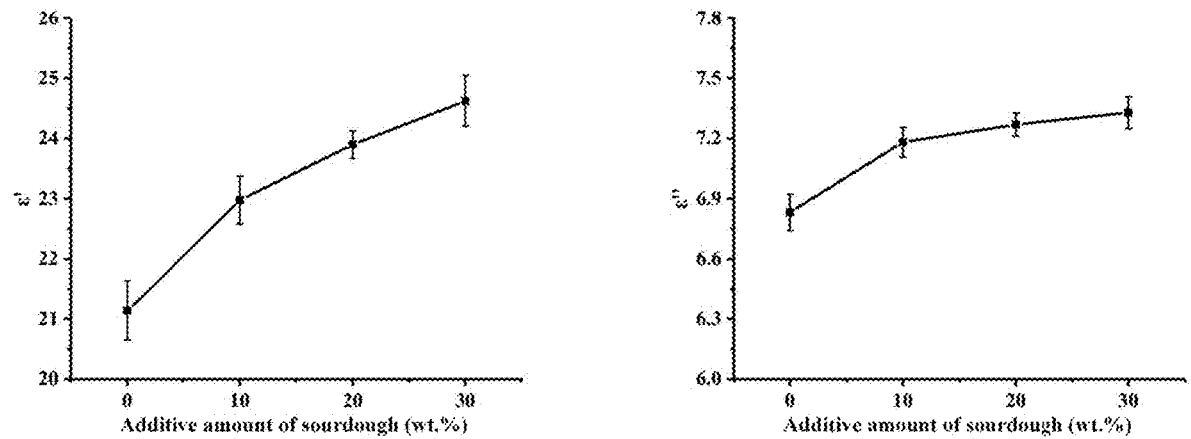
FIG. 1 is the effect of different additive amount of sourdough on the dielectric properties of the raw steamed cake batter at the end of fermentation (DY=175).

To make the purpose, technical solutions and advantages of the present disclosure clearer, the specific examples of the present disclosure will be described below in detail in combination with the figures.

In order to better clarify that the method of the present disclosure can improve the effect of microwave heating and the quality of the products, based on the enhancement of dielectric properties in food material and the adjustment of the dielectric properties in the batter by sourdough addition, a series of tests are conducted around related parameters described as follows:

Determination of the dielectric properties of the fermented batter: dielectric properties including the dielectric constant and the loss factor of the batter were determined by an open-ended coaxial probe technique at 2.45 GHz. A measurement system comprises an E5071C vector network analyzer( ), an 85070E high-temperature probe), an open-ended coaxial line, a computer and test software. Instrument calibration: turning on the instrument, warming up for 30 min, setting the frequency range from 2.4 to 2.5 GHz and making the midpoint frequency to be 2.45 GHz. The probe was first calibrated using three materials, air, water (of known temperature) and metal, to ensure the accuracy of the measurements.

Sample measurements: placing the sample on the sample stage, making the sample to contact with the probe completely and avoiding the generation of air bubbles, and reading the ε' and ε" by online detection software. Each sample was measured in triplicate, and the average value was taken.

Determination of the penetration depth of the fermented batter: the penetration depth ($d_p$) of the microwave was defined as a depth (unit: m) at which the dissipation power decays to 1/e (Euler number e≈2.718), and $d_p$ was calculated according to formula (1):

$$d_p = \frac{c}{2\pi f \sqrt{2\varepsilon' \left[ \sqrt{1 + \left(\frac{\varepsilon''}{\varepsilon'}\right)^2} - 1 \right]}} \quad (1)$$

where c was vacuum speed of light ($3\times10^8$ m/s), f was the frequency of electromagnetic wave (Hz).

Determination of the physical properties of the microwave-steamed cake: taking the central part of the product cooled for 60 min, cutting into uniform blocks of 2 cm×2 cm×2 cm, using a texture analyzer with a cylindrical probe (P/36R) to run a texture profile analysis (TPA) test, in which a speed of 1.7 mm/s was utilized for the cake strain to 40% of the initial state, and obtaining the hardness, chewiness and resilience of the microwave-steamed cake.

Determination of the specific volume of the microwave-steamed cake: specific volume was measured by the millet displacement method, and taking two beakers with the same volume, filling the beaker 1 with millet, and scraping the beaker mouth with a ruler; then putting the product in the beaker 2, filling the beaker 2 with the millet in the beaker 1, using a ruler to scrape the mouth of the beaker as well, and measuring the remaining millet volume with a cylinder to count as the volume of the product.

The following comparative examples and examples are described by taking the preparation of steamed cake made of wheat flour as examples.

Comparative Example 1

In this comparative example, the preparation of the microwave-steamed cake without sourdough addition is illustrated as an example, and the details are as follows:

(1) Preparation of the raw batter of the microwave-steamed cake: taking 350 portions of wheat starch and 50 portions of wheat gluten, mixing with 48 portions of sugar, 4.8 portions of active dry yeast, 2 portions of baking powder and 280 portions of water by weight, and then whipping in a stand mixer with a K-blade at 240 rpm for 12 min to obtain the raw batter.

(2) Fermentation of the raw batter of the microwave-steamed cake: taking 100 portions of the raw batter to a cylindrical mold coated with vegetable oil in advance, vibrating flattened, and then fermenting in a fermentation room for 40 min at 37° C. and 80% relative humidity.

(3) Microwave heating of the microwave-steamed cake: taking the raw fermented batter and heating in a microwave oven at a microwave condition of 4.25 W/g for 2 min and then cooling to obtain the microwave-steamed cake.

Comparative Example 2

In this comparative example, the steamed cake is prepared by the traditional steam heating without sourdough addition, and the details are as follows:

(1) Preparation of the raw batter of the steamed cake: see comparative example 1.

(2) Fermentation of the raw batter of the steamed cake: see comparative example 1.

(3) Steam heating of the steamed cake: taking the fermented batter and heating in a cottage steamer for 15 min at 100° C., and then cooling to obtain the steamed cake.

Example 1

The present example provides a microwave processing method for food made of flour and rice fermented with sourdough prepared by an existing process, including:

(1) Preparation of sourdough fermented by *Lactobacillus plantarum*: taking 100 portions of high-gluten wheat flour, 100 portions of water and 0.1 portions of lyophilized *lactobacillus* starter by weight, well mixing and stirring in a beaker, and then fermenting in a cultivation cabinet for 12 h at 37° C. to obtain the sourdough fermented by *Lactobacillus plantarum*, wherein the initial living number of lactic acid bacteria in the sourdough is $1 \times 10^7$ CFU/g flour and the content of wet gluten in the high-gluten wheat flour is 30~32%.

With reference to the above preparation process, it can be known that the DY of the sourdough in this example is:

$$DY = \frac{(\text{flour(g)} + \text{water(g)}) \times 100}{\text{flour(g)}} = \frac{(100(g) + 100(g)) \times 100}{100(g)} = 200$$

(2) Preparation of the raw batter of the microwave-steamed cake: taking 350 portions of wheat starch and 50 portions of wheat gluten, mixing with 100 portions of the sourdough, 60 portions of sugar, 6 portions of active dry yeast, 2.5 portions of baking powder, and 300 portions of water by weight, and then whipping in a stand mixer with a K-blade at 240 rpm for 12 min to obtain the raw batter.

With reference to the above preparation process, it can be known that the additive amount of the sourdough is $$\frac{100(g)}{350(g) + 50(g)} \times 100\% = 25\%$$

of the steamed cake raw material.

(3) Fermentation of the raw batter of the microwave-steamed cake: taking 100 portions of the raw batter to a cylindrical mold coated with vegetable oil in advance, vibrating flattened, and then fermenting in a fermentation room at 37° C. and 80% relative humidity.

(4) Adjustment of the dielectric properties of the fermented batter: controlling the raw batter in the dielectric constant of 30~36, the loss factor of 9.5~10.2, the moisture content of 51.0~51.5%, and the water activity of 0.925~0.935 at the beginning of fermentation, and then fermenting for 40 min under the dielectric constant of 27~30, the loss factor of 8.1~8.3, the moisture content of 51.0~52.0% and the water activity of 0.945~0.955 at the end of fermentation.

(5) Microwave heating of the microwave-steamed cake: taking the raw fermented batter and heating in a microwave oven at a microwave condition of 4.25 W/g for 2 min, and then cooling to obtain the microwave-steamed cake.

Example 2

For comparison, in this example, the steamed cake is prepared by the traditional steam heating with sourdough addition, and the details are as follows:

(1) Preparation of sourdough fermented by *Lactobacillus plantarum*: see example 1.

(2) Preparation of the raw batter of the steamed cake: see example 1.

(3) Fermentation of the raw batter of the steamed cake: see example 1.

(4) Steam heating of the steamed cake: taking the fermented batter and heating in a cottage steamer for 15 min at 100° C., and then cooling to obtain the steamed cake.

Example 3

A Box-Behnken design (BBD) is adopted to optimize the sourdough fermentation process, aiming to obtain a microwave-steamed cake with a soft and elastic texture, good chewiness and large specific volume, including:

(1) Preparation of sourdough fermented by *Lactobacillus plantarum*: taking 200 portions of high-gluten wheat flour, 150~250 portions of water and 0.2~0.6 portions of lyophilized *lactobacillus* starter by weight, well mixing and stirring in a beaker, and then fermenting in a cultivation cabinet for 8~16 h at 37° C. to obtain the sourdough fermented by *Lactobacillus plantarum*, wherein the initial living number of lactic acid bacteria in the sourdough is $1~3 \times 10^7$ CFU/g flour and the range of DY is 175~225.

(2) Preparation of the raw batter of the microwave-steamed cake: taking 245~315 portions of wheat starch and 35~35 portions of wheat gluten, mixing with 40~120 portions of the sourdough, 48 portions of sugar, 4.8 portions of active dry yeast, 2 portions of baking powder, and 213.3~262.8 portions of water by weight, and then whipping in a stand mixer with a K-blade at 240 rpm for 12 min to obtain the raw batter.

(3) Fermentation of the raw batter of the microwave-steamed cake: taking 100 portions of the raw batter to a cylindrical mold coated with vegetable oil in advance, vibrating flattened, and then fermenting in a fermentation room at 37° C. and 80% relative humidity.

(4) Adjustment of the dielectric properties of the fermented batter: controlling the raw batter in the dielectric constant of 30~36, the loss factor of 9.5~10.2, the moisture content of 51.0~51.5% and the water activity of 0.925~0.935 at the beginning of fermentation, and then fermenting for 40 min under the dielectric constant of 23~30, the loss factor of 7.2~8.0, the moisture content of 51.0~52.0% and the water activity of 0.945~0.955 at the end of fermentation.

(5) Microwave heating of the microwave-steamed cake: taking the raw fermented batter and heating in a microwave oven at a microwave condition of 4.25 W/g for 2 min, and then cooling to obtain the microwave-steamed cake.

The obtained results are shown in Table 2;

After statistical analysis of the data in Table 2, the optimal sourdough fermentation process is determined as follows: sourdough DY of 175, sourdough fermentation time of 12.5 h and sourdough additive amount of 10 wt. %. The dielectric constant of the raw batter prepared by the optimum sourdough parameters is 22.976±0.399 at the end of fermentation, and the loss factor is 7.181±0.114.

Example 4

In this example, the microwave-steamed cake is prepared with the optimized sourdough addition, the details are as follows:

(1) Preparation of sourdough fermented by *Lactobacillus plantarum*: taking 200 portions of high-gluten wheat flour, 150 portions of water and 0.2 portions of lyophilized *lactobacillus* starter by weight, well mixing and stirring in a beaker, and then fermenting in a cultivation cabinet for 12.5 h at 37° C. to obtain the sourdough fermented by *Lactobacillus plantarum*, wherein the initial living number of lactic acid bacteria in the sourdough is 1×10$^7$ CFU/g flour and the DY is 175.

(2) Preparation of the raw batter of the microwave-steamed cake: taking 315 portions of wheat starch and 45 portions of wheat gluten, mixing with 40 portions of the sourdough, 48 portions of sugar, 4.8 portions of active dry yeast, 2 portions of baking powder, and 213~263 portions of water by weight, and then whipping in a stand mixer with a K-blade at 240 rpm for 12 min to obtain the raw batter. The additive amount of sourdough is 11 wt. % of the steamed cake raw material.

(3) Fermentation of the raw batter of the microwave-steamed cake: taking 100 portions of the raw batter to a cylindrical mold coated with vegetable oil in advance, vibrating flattened, and then fermenting in a fermentation room at 37° C. and 80% relative humidity.

(4) Adjustment of the dielectric properties of the fermented batter: controlling the raw batter in the dielectric constant of 3034, the loss factor of 9.0~10.5, the moisture content of 51.0~51.5% and the water activity of 0.9250.935 at the beginning of fermentation, and then fermenting for 40 min under the dielectric constant of 2224, the loss factor of 7.1~7.5, the moisture content of 51.0~52.0% and the water activity of 0.9450.955 at the end of fermentation.

(5) Microwave heating of the microwave-steamed cake: taking the raw fermented batter and heating in a microwave oven at a microwave condition of 4.25 W/g for 2 min, and then cooling to obtain the microwave-steamed cake.

Example 5

For comparison, in this example, the steamed cake is prepared by the traditional steam heating with the optimized sourdough addition and the details are as follows:

(1) Preparation of sourdough fermented by *Lactobacillus plantarum*: see example 4.

(2) Preparation of the raw batter of the steamed cake: see example 4.

(3) Fermentation of the raw batter of the steamed cake: see example 4.

(4) Steam heating of the steamed cake: taking the fermented batter and heating in a cottage steamer for 15 min at 100° C., and then cooling to obtain the steamed cake.

The quality characteristics of the steamed cakes prepared by the above-mentioned comparative examples and examples are shown in Table 1 below.

TABLE 1

Comparison of the quality characteristics of the steamed cakes according to the present disclosure

| Samples | Specific volume(cm$^3$/g) | Hardness(g) | Chewiness | Resilience |
|---|---|---|---|---|
| Comparative example 1 | 3.747 ± 0.357 | 1094 ± 58 | 951 ± 45 | 0.505 ± 0.024 |
| Comparative example 2 | 3.354 ± 0.296 | 875 ± 56 | 594 ± 32 | 0.316 ± 0.042 |
| Example 1 | 3.345 ± 0.111 | 898 ± 80 | 776 ± 63 | 0.544 ± 0.021 |
| Example 2 | 2.935 ± 0.069 | 828 ± 46 | 614 ± 16 | 0.371 ± 0.024 |
| Example 4 | 4.359 ± 0.104 | 762 ± 46 | 686 ± 36 | 0.530 ± 0.021 |
| Example 5 | 3.923 ± 0.046 | 685 ± 58 | 539 ± 20 | 0.384 ± 0.028 |

TABLE 2

Run results of the Box-Behnken design of sourdough fermentation process

| Run | DY | Fermentation time (h) | Additive amount (wt. %) | Specific volume (cm$^3$/g) | Hardness (g) | Chewiness | Resilience |
|---|---|---|---|---|---|---|---|
| 1 | 200 | 12 | 20 | 2.746 ± 0.042 | 887 ± 59 | 779 ± 59 | 0.536 ± 0.012 |
| 2 | 225 | 12 | 30 | 2.068 ± 0.143 | 845 ± 131 | 748 ± 115 | 0.587 ± 0.015 |
| 3 | 200 | 12 | 20 | 3.362 ± 0.204 | 770 ± 83 | 598 ± 109 | 0.508 ± 0.009 |
| 4 | 200 | 8 | 30 | 2.896 ± 0.096 | 731 ± 67 | 626 ± 54 | 0.587 ± 0.013 |
| 5 | 200 | 16 | 20 | 3.709 ± 0.181 | 623 ± 41 | 492 ± 71 | 0.512 ± 0.013 |
| 6 | 175 | 16 | 20 | 2.801 ± 0.116 | 902 ± 111 | 741 ± 147 | 0.546 ± 0.016 |
| 7 | 200 | 8 | 10 | 3.844 ± 0.089 | 750 ± 64 | 597 ± 51 | 0.492 ± 0.010 |
| 8 | 200 | 12 | 20 | 3.405 ± 0.074 | 745 ± 75 | 614 ± 59 | 0.518 ± 0.009 |
| 9 | 225 | 12 | 10 | 3.426 ± 0.157 | 796 ± 94 | 657 ± 81 | 0.518 ± 0.009 |
| 10 | 225 | 16 | 20 | 2.614 ± 0.091 | 859 ± 89 | 733 ± 72 | 0.558 ± 0.012 |
| 11 | 175 | 8 | 20 | 3.666 ± 0.114 | 669 ± 67 | 551 ± 52 | 0.513 ± 0.009 |
| 12 | 225 | 8 | 20 | 3.362 ± 0.204 | 693 ± 94 | 568 ± 111 | 0.546 ± 0.021 |
| 13 | 175 | 12 | 30 | 2.180 ± 0.156 | 879 ± 97 | 766 ± 80 | 0.571 ± 0.014 |

TABLE 2-continued

Run results of the Box-Behnken design of sourdough fermentation process

| Run | DY | Fermentation time (h) | Additive amount (wt. %) | Specific volume (cm³/g) | Hardness (g) | Chewiness | Resilience |
|---|---|---|---|---|---|---|---|
| 14 | 200 | 16 | 30 | 2.619 ± 0.045 | 799 ± 87 | 688 ± 69 | 0.553 ± 0.012 |
| 15 | 175 | 12 | 10 | 3.512 ± 0.215 | 760 ± 89 | 621 ± 77 | 0.497 ± 0.017 |
| 16 | 200 | 12 | 20 | 2.800 ± 0.078 | 875 ± 86 | 801 ± 81 | 0.538 ± 0.010 |
| 17 | 200 | 16 | 10 | 3.418 ± 0.096 | 893 ± 79 | 725 ± 54 | 0.485 ± 0.008 |

Figure 2:
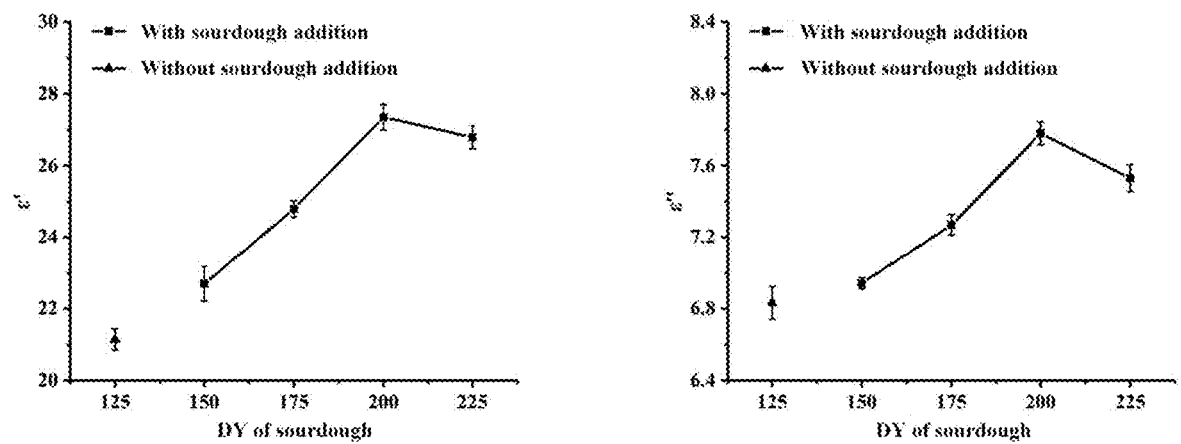
FIG. 2 is the effect of sourdough addition with different DY on the dielectric properties of the raw steamed cake batter at the end of fermentation (the additive amount of sourdough is 20 wt. %).

Comparing the quality characteristics of the steamed cake prepared in the examples and comparative examples shown in Table 1 and combining with FIG. 1 and FIG. 2, it can be seen that the addition of sourdough significantly improves the dielectric properties of the raw batter; and with the comparison of the results between the comparative example 1 and example 1, and the results between the comparative example 2 and example 2 in Table 1, indicating that the hardness and specific volume of the steamed cake decrease obviously with sourdough addition regardless of microwave heating or steam heating. In addition, in the comparative example 1 and example 1, the chewiness of the steamed cake prepared by microwave heating decreases and resilience improves slightly with the addition of sourdough; while in the comparative example 2 and example 2, the chewiness and resilience of the steamed cake prepared by steaming heating improve slightly as well.

As shown in FIG. 1, FIG. 2 and Table 2, it illuminates that the dielectric constant and loss factor of the raw batter at the end of fermentation are on the rise with the increase of the DY and additive amount of sourdough. Based on the above effect of sourdough fermentation in the dielectric regulation of the raw batter, adjusting the dielectric properties of the raw batter to a suitable level can significantly improve the effect and efficiency of microwave heating.

In addition, comparing the results between the example 1 and example 4 in Table 1, it can be seen that:

The specific volume of the microwave-steamed cake with the optimized sourdough addition increases by 30.3% and the hardness decreases by 15.1%, that is, the steamed cake obtained by microwave processing with the optimized sourdough addition in this application has a larger specific volume and a softer texture, and although there is a decrease in its chewiness and resilience, it is obviously better than steamed cake. Therefore, the microwave-steamed cake prepared by the sourdough of the present disclosure has good elasticity, toughness and chewiness.

Figure 3:
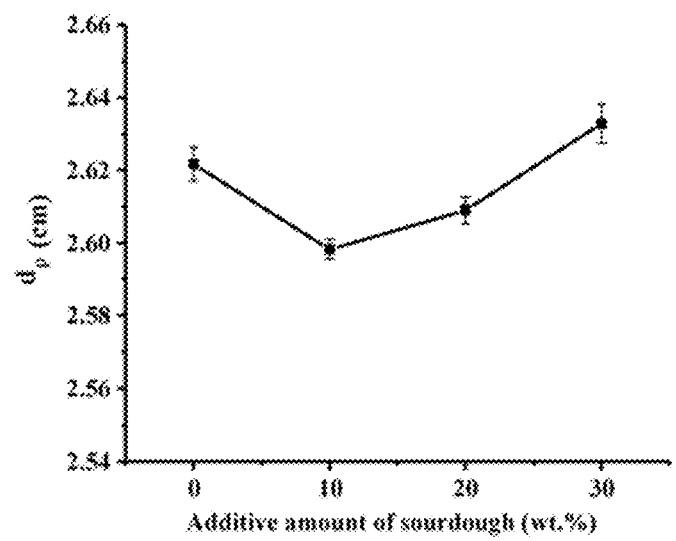
FIG. 3 is the effect of different additive amount of sourdough on the penetration depth of the raw steamed cake batter at the end of fermentation (DY=175).
Figure 4:
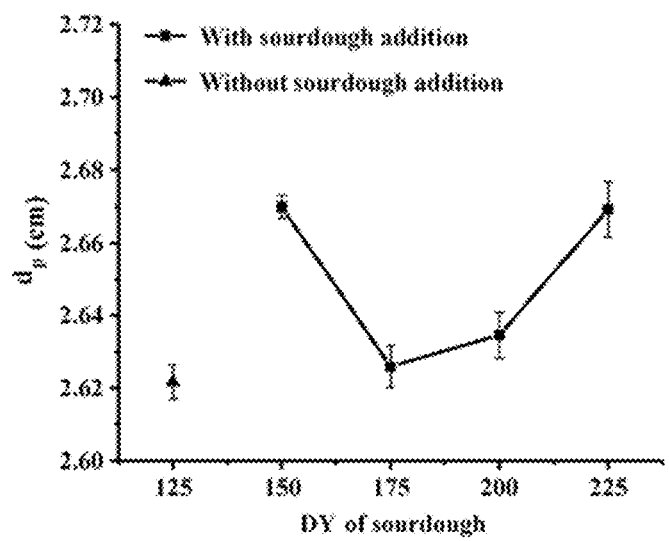
FIG. 4 is the effect of sourdough addition with different DY on the penetration depth of the raw steamed cake batter at the end of fermentation (the additive amount of sourdough is 20 wt. %).

Moreover, the penetration depth characterizes the attenuation capacity of the microwave in the material, which reflects the uniformity of microwave heating and is determined by the dielectric properties of the material. The greater the penetration depth, the more uniform the microwave heating of the material can be. FIG. 3 and FIG. 4 illustrate that the penetration depth of the steamed cake batter shows a trend of decrease first and then increasing with the increase of the DY and additive amount of sourdough, and the microwave penetration depth has a certain reference value for the size selection of the mold and the adjustment of the dielectric properties of the batter.

According to the results in Table 1, microwave processing makes the steamed cake have higher chewiness and resilience, tighter structure and not easy to collapse and drop slag after cooling when compared to steam heating. However, the rapid heating of microwave processing also brings some quality defects of large hardness and rough texture. With the addition of sourdough, the hardness of microwave-steamed cake significantly reduces, while the specific volume and chewiness are decreased as well, which is far from the ideal product quality, namely, large specific volume, low hardness and high chewiness, so the sourdough fermentation process is optimized in this application.

Comparing the microwave-steamed cake prepared by the optimized sourdough with the one prepared without sourdough, it is found that the microwave-steamed cake adjusted to higher dielectric properties with the optimized sourdough addition possesses a larger specific volume and a softer texture than that of the microwave-steamed cake with low dielectric properties, and the chewiness and resilience are better than the steamed cake though they reduce. The microwave-steamed cake prepared by the sourdough of the present disclosure has good elasticity, toughness, chewiness and does not easily drop slag when cutting, indicating that the regulating effect of the microbial fermentation on the dielectric properties of the food material can effectively improve the physical properties of the fermented steamed cake.

Furthermore, the sensory evaluation was carried out by 7 panelists from the experts in this technical field. The panelists were asked to evaluate the samples for their sensory attributes including appearance and color, flavor, elasticity/resilience, structure of pores, taste, chewiness and overall evaluation, and the evaluation criteria are shown in Table 3. Sensory evaluation results are shown in Table 4.

TABLE 3

Sensory evaluation criteria.

| Item | Criteria | Scores |
|---|---|---|
| Appearance and color | Smooth skin, showing uniform yellow | 10 |
| Flavor | Special fermented aroma, pure and strong flavor | 10 |
| Elasticity/resilience | Soft and elastic, quick recovery after pressing | 10 |
| Structure of pores | Fine and uniform pores, thin wall of pores, without obvious holes and firm parts, and showing spongy structure | 10 |

TABLE 3-continued

Sensory evaluation criteria.

| Item | Criteria | Scores |
|---|---|---|
| Taste | Special fermented taste, moderate sweetness and acidities | 10 |
| Chewiness | Easy to chew, moderate softness and hardness, non-sticky teeth | 10 |
| Overall evaluation | Good color, rich flavor, soft and elastic, uniform and fine pores, chewy, and delicate taste | 10 |

TABLE 4

The results of sensory evaluation.

| Sensory attributes | Comparative example 1 | Comparative example 2 | Example 1 | Example 2 | Example 4 | Example 5 |
|---|---|---|---|---|---|---|
| Appearance and color | 8.56 | 7.75 | 8.94 | 8.34 | 9.05 | 8.83 |
| Flavor | 8.31 | 8.20 | 8.43 | 8.28 | 8.63 | 8.46 |
| Elasticity/resilience | 8.97 | 5.43 | 8.63 | 6.03 | 8.52 | 6.88 |
| Structure of pores | 7.83 | 6.86 | 8.16 | 7.05 | 8.47 | 7.39 |
| Taste | 8.86 | 8.67 | 8.84 | 8.79 | 8.94 | 8.63 |
| Chewiness | 8.69 | 4.98 | 8.39 | 5.97 | 8.23 | 6.33 |
| Overall evaluation | 8.75 | 6.82 | 8.97 | 7.43 | 9.16 | 7.74 |

It can be seen in Table 4 that the microwave-steamed cake of the present disclosure has good quality of rich flavor, pure and delicate taste, uniform and fine pores, non-sticky teeth and chewy, and is suitable for the native consumers.

The foregoing is only preferred exemplary examples and is not intended to be limiting of the present disclosure, and any modifications, equivalent substitutions, improvements and the like within the spirit and principles of the present disclosure are intended to be embraced by the protection range of the present disclosure.

What is claimed is:

1. A method for processing a steamed cake, comprising:
   (a) preparing a sourdough by mixing high-gluten wheat flour, water, and *lactobacillus* starter, wherein the high-gluten wheat flour comprises 30% to 32% wet gluten, and wherein the sourdough comprises an initial living number of lactic acid bacteria of $1 \times 10^7$ to $3 \times 10^7$ CFU/g high-gluten wheat flour,
   (b) fermenting the sourdough at 37° C. to 38° C. to create a fermented sourdough,
   (c) preparing a steamed cake batter by adding wheat starch, wheat gluten, sugar, active dry yeast, baking powder, and water to the fermented sourdough,
   (d) fermenting the steamed cake batter at 37° C. to 38° C., 80% to 85% relative humidity, wherein a dielectric constant of the steamed cake batter is 20 to 34, a loss factor of the steamed cake batter is 6.3 to 10.5, a moisture content of the steamed cake batter is 45% to 55%, and water activity of the steamed cake batter is 0.920 to 0.980, when fermenting begins; and
   (e) heating with a microwave at an intensity of 4.25 W/g of fermented steamed cake batter, and
   (f) cooling to obtain the microwave-steamed cake.

2. The method according to claim 1, wherein the steamed cake batter is fermented under the dielectric constant of 22 to 24, wherein the loss factor is 7.1 to 7.5, wherein the moisture content is 50% to 52%, and wherein the water activity is 0.940 to 0.960.

3. The method according to claim 1, wherein a dough yield (DY) of the sourdough is 170 to 180 during preparation, wherein the DY is defined as:

$$DY = \frac{(\text{flour(g)} + \text{water(g)})) \times 100}{\text{flour(g)}},$$

and, wherein the sourdough is fermented for 12 hours to 13 hours.

4. The method according to claim 1, wherein the amount of fermented sourdough added in the steamed cake batter is 8 wt % to 12 wt %, by weight.

5. The method according to claim 1, wherein during the preparation of the sourdough the *lactobacillus* starter is added at 0.1 wt % to 0.3 wt % by weight of the high-gluten wheat flour, and lactic acid bacteria is present in the sourdough at $1 \times 10^7$ CFU/g flour.

6. The method according to claim 5, wherein the preparation of the sourdough further comprises: mixing 200 portions of the high-gluten wheat flour, 140 to 160 portions of the water, and 0.2 to 0.6 portions of the *lactobacillus* starter by weight, wherein the *lactobacillus* starter is lyophilized *lactobacillus* starter, and
   wherein fermenting the sourdough is performed in a cultivation cabinet at 37° C. for 12 hours to 13 hours.

7. The method according to claim 1, wherein the wheat gluten is present in an amount of 10% to 20% of the wheat starch.

8. The method according to claim 1, wherein preparing the steamed cake batter further comprises: adjusting the dielectric constant to 30 to 34, the loss factor to 9.0 to 10.5, the moisture content to 50% to 52%, and the water activity to 0.940 to 0.960 when fermenting begins.

9. The method according to claim 1, wherein the dielectric constant and the loss factor of the steamed cake batter are measured at 2.45 GHz using an open-ended coaxial probe technique; as measured by a E5071C vector network analyzer, a 85070E high-temperature probe, an open-ended coaxial line, a computer, and test software.

* * * * *

UNITED STATES PATENT AND TRADEMARK OFFICE
CERTIFICATE OF CORRECTION

PATENT NO. : 11,716,998 B2  
APPLICATION NO. : 16/916365  
DATED : August 8, 2023  
INVENTOR(S) : Fan et al.

Page 1 of 1

It is certified that error appears in the above-identified patent and that said Letters Patent is hereby corrected as shown below:

On the Title Page

Item (72) should read:  
Inventors:  
Daming FAN, Wuxi (CN); Bowen YAN, Wuxi (CN); Yejun WU, Wuxi (CN); Huizhang LIAN, Wuxi (CN); Kai WANG, Wuxi (CN); Jianxin ZHAO, Wuxi (CN); Hao ZHANG, Wuxi (CN); Huayu YANG, Wuxi (CN); Xiuxiu LI, Wuxi (CN); Yin ZHANG, Wuxi (CN); Jinbiao FEI, Wuxi (CN); Wenguo ZHOU, Wuxi (CN); Ke PANG, Wuxi (CN); Jianlian HUANG, Wuxi (CN); Qingmiao ZHANG, Wuxi (CN); Wei CHEN, Wuxi (CN)

Signed and Sealed this  
Fifth Day of August, 2025

Coke Morgan Stewart  
*Acting Director of the United States Patent and Trademark Office*